US006434381B1

United States Patent
Moore et al.

(10) Patent No.: US 6,434,381 B1
(45) Date of Patent: Aug. 13, 2002

(54) METHOD AND APPARATUS IN A WIRELESS COMMUNICATION SYSTEM FOR RETRIEVING LOCAL INFORMATION AND SERVICES

(75) Inventors: Morris Moore, Southlake; Jheroen Pieter Dorenbosch, Paradise, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/520,930

(22) Filed: Mar. 8, 2000

(51) Int. Cl.[7] ................................................ H04M 3/42
(52) U.S. Cl. ........................ 455/414; 455/456; 455/517
(58) Field of Search ........................ 455/426, 66, 456, 455/556, 553, 457, 432, 421–422, 554–555, 557, 466, 517, 483, 418–420, 458; 340/825.3, 905; 209/223, 224

(56) References Cited

U.S. PATENT DOCUMENTS

| | | | | |
|---|---|---|---|---|
| 4,891,638 A | | 1/1990 | Davis | 340/825.44 |
| 5,089,814 A | | 2/1992 | DeLuca et al. | 340/825.49 |
| 5,539,395 A | | 7/1996 | Buss et al. | 340/827 |
| 5,684,859 A | | 11/1997 | Chanroo et al. | 379/58 |
| 5,930,474 A | | 7/1999 | Dunworth et al. | 395/200.47 |
| 5,930,699 A | * | 7/1999 | Bhatia | 455/414 |
| 5,963,861 A | * | 10/1999 | Hanson | 455/422 |
| 6,014,090 A | * | 1/2000 | Rosen et al. | 340/905 |
| 6,049,711 A | * | 4/2000 | Ben-Yehezkel et al. | 455/414 |
| 6,052,591 A | * | 4/2000 | Bhatia | 455/445 |
| 6,101,381 A | * | 8/2000 | Tajima et al. | 455/414 |
| 6,108,533 A | * | 8/2000 | Brohoff | 455/414 |
| 6,125,282 A | * | 9/2000 | Urabe | 455/552 |
| 6,131,028 A | * | 10/2000 | Whitington | 455/435 |
| 6,169,894 B1 | * | 1/2001 | McCormick et al. | 455/414 |
| 6,169,897 B1 | * | 1/2001 | Kariya | 455/426 |

FOREIGN PATENT DOCUMENTS

| | | | | |
|---|---|---|---|---|
| FR | 0647076 A1 | * | 5/1995 | H04Q/7/22 |
| WO | 9741654 | * | 11/1997 | H04H/1/00 |

* cited by examiner

*Primary Examiner*—Daniel Hunter
*Assistant Examiner*—Pablo N Tran
(74) *Attorney, Agent, or Firm*—Charles W. Bethards; Hisashi D. Watanabe

(57) ABSTRACT

A mobile station (106) of a wireless communication system (100) detects (502) a predetermined user command applied to a user interface (308) of the mobile station. In response, the mobile station transmits (504), to a fixed portion (110) of the wireless communication system, a message including a request for local information and services. The fixed portion receives (506) the message, and, in response, determines (508) the location at which the mobile station is positioned. The fixed portion then generates (510) A the local information and services custom-tailored to a predetermined area around the location, and sends (512) the local information and services to the mobile station.

6 Claims, 5 Drawing Sheets

METHOD AND APPARATUS IN A WIRELESS COMMUNICATION SYSTEM FOR RETRIEVING LOCAL INFORMATION AND SERVICES

FIELD OF THE INVENTION

This invention relates in general to wireless communication systems, and more specifically to a method and apparatus for retrieving local information and services custom-tailored to a location at which a mobile station is positioned.

BACKGROUND OF THE INVENTION

It is becoming increasingly popular to equip mobile stations, such as cell phones, with wireless browsers for browsing the Internet. Such devices allow access to information and services virtually anywhere at any time.

A problem with wireless browsers that has not been fully addressed in the prior art is how to obtain local information and services, such as information about nearby restaurants and services, such as travel reservations. Current practice on the Internet for obtaining local information and services is to require the user to enter a local address or zip code. That is not always practical for a mobile station, because it can move around, and the user may not know the address or zip code of the current location of the mobile station.

Thus, what is needed is a method and apparatus for retrieving local information and services custom-tailored to a location at which a mobile station is positioned. Preferably, the method and apparatus will function automatically to provide the local information and services, and will not require the user to enter an address or zip code.

DETAILED DESCRIPTION OF THE DRAWINGS

Figure 1:
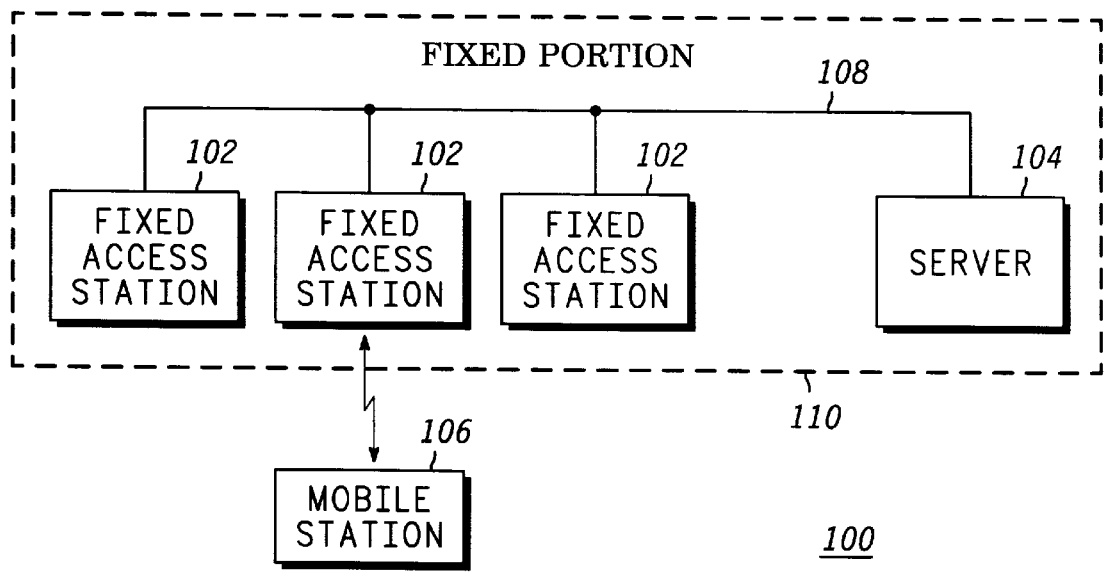
FIG. 1 is an electrical block diagram of an exemplary wireless communication system in accordance with the present invention.

Referring to FIG. 1, an electrical block diagram depicts an exemplary wireless communication system 100 in accordance with the present invention, comprising a fixed portion 110, including at least one fixed access station 102 preferably coupled through a conventional network 108, such as a local area network (LAN) or a combination of LANs and one or more wide area networks (WANs), to a server 104 for communicating therewith. Preferably, the server 104 is programmed to generate the local information and services custom-tailored to a predetermined area around the location of the mobile station 106. Depending on the type of local information and services being accessed, the server 104 can be owned and programmed by the local service provider, or the server 104 can be a remote server, e.g., a server on the Internet. The network can be either wired or wireless. The wireless communication system 100 further comprises a mobile station 106 coupled wirelessly to the fixed access station 102 for communicating therewith through well-known techniques. Operation of the wireless communication system 100 in accordance with the present invention will be described further herein below.

Figure 2:
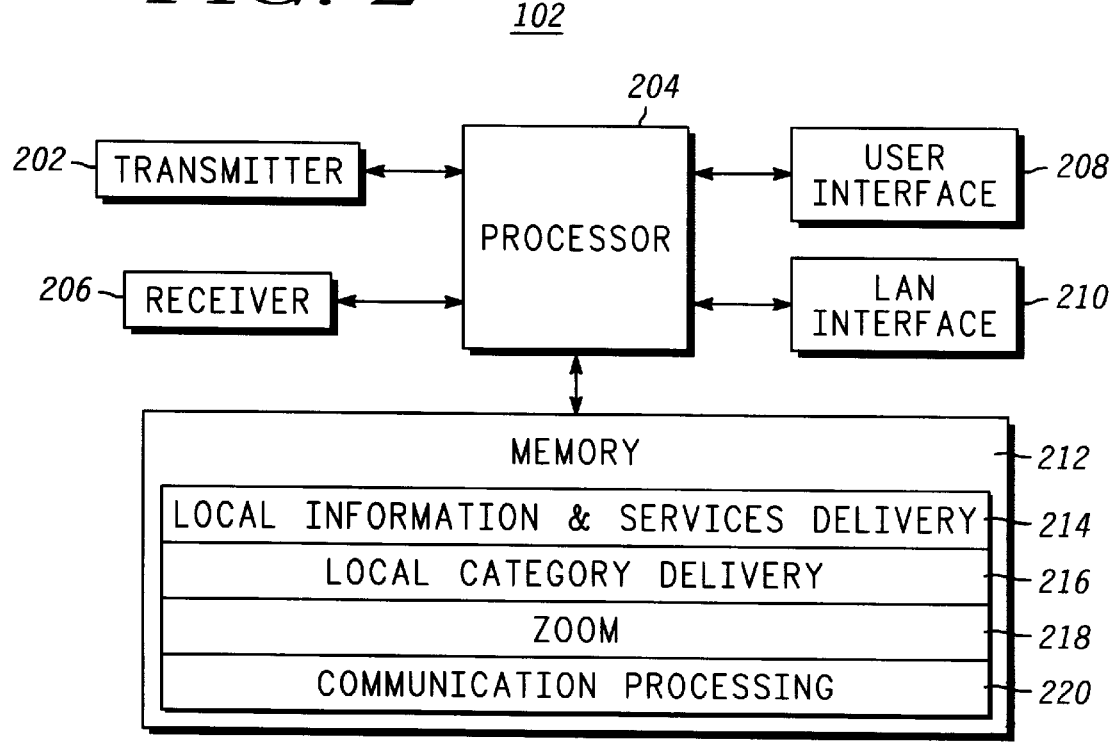
FIG. 2 is an electrical block diagram of an exemplary fixed access station in accordance with the present invention.

Referring to FIG. 2, an electrical block diagram depicts an exemplary fixed access station 102 in accordance with the present invention, comprising a conventional receiver 206 for receiving a message from the mobile station 106, the message comprising a request for local information and services. The receiver 206 is coupled to a conventional processor 204 for processing the request. A conventional transmitter 202 is coupled to the processor 204 for sending the local information and services to the mobile station 106. A conventional user interface 208, e.g., a keyboard and display, preferably is also coupled to the processor 204 for allowing the service provider to program and test the fixed access station 102. A conventional network interface 210 is also coupled to the processor 204 for communicating with the server 104 over the network 108. Through the network 108, the processor 204 can cooperate with the server 104 to determine the location at which the mobile station 106 is positioned, in response to receiving the message. In addition, the fixed access station 102 comprises a conventional memory 212 which provides storage for operating software and variables used in accordance with the present invention.

The memory 212 comprises a local information and services delivery program 214 for programming the processor 204 to access the server 104 to obtain the local information and services appropriate for the location of the mobile station 106, and to control the transmitter 202 to deliver the local information and services to the mobile station 106. The memory 212 further comprises a local category delivery program 216 for programming the processor 204 to cooperate with the server to limit the local information and services to a particular category of information and services last accessed by the mobile station, when the request from the mobile station 106 includes an indication that the local information and services for a particular category of information and services which was last accessed by the mobile station 106 is desired. The memory 212 also includes a zoom program 218 for programming the processor 204 to cooperate with the receiver 206 to receive an acknowledgment from the mobile station 106 that the local information and services have been received; and, after receiving the acknowledgment, to cooperate further with the receiver 206 to receive a second message from the mobile station 106 reporting an unchanged location (i.e., the same location reported previously, within a predetermined measurement tolerance) and requesting the local information and services. The zoom program 218 further programs the processor 204 to cooperate with the server to reduce the size of the predetermined area surrounding the mobile station 106, to produce a smaller local area, in response to the second message. In addition, the zoom program 218 programs the processor 204 to cooperate further with the server 104 to regenerate the local information and services, based upon the smaller local area, and to send the regenerated local information and services to the mobile station 106. The memory 212 also includes a conventional communication processing program 220 for programming the processor 204 to control the transmitter 202 and the receiver 206 to communicate with the mobile station 106, and further to control the network interface 210 to communicate with the server 104 through the network 108 using well-known communication techniques.

Figure 3:
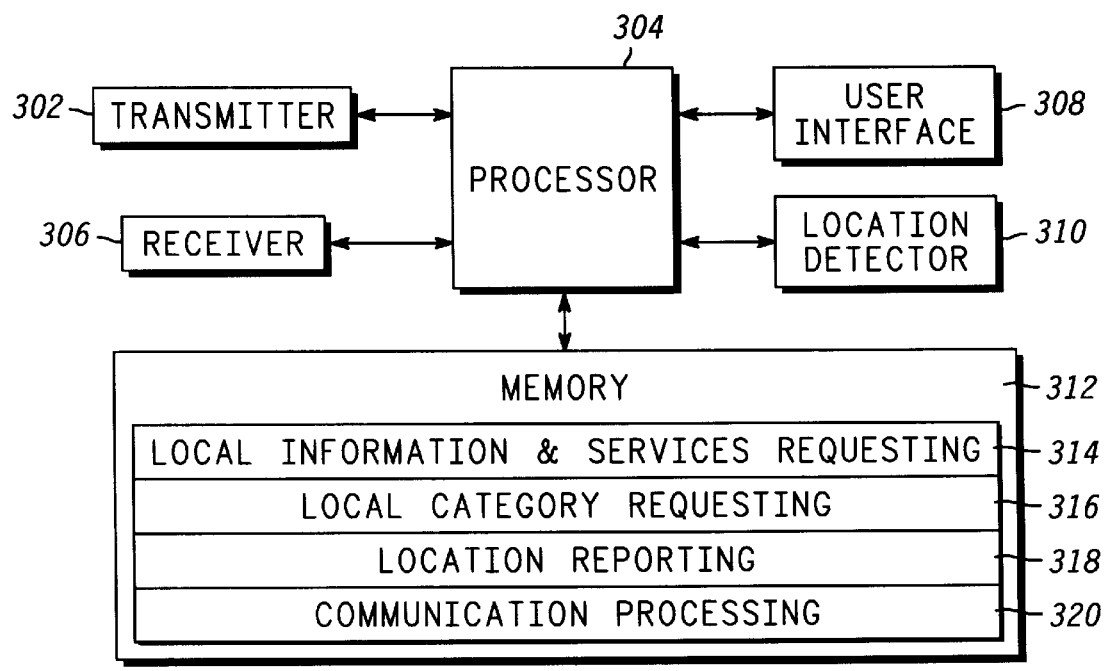
FIG. 3 is an electrical block diagram of an exemplary mobile station in accordance with the present invention.

Referring to FIG. 3, an electrical block diagram depicts an exemplary mobile station 106 in accordance with the present invention, comprising a conventional transmitter 302 for requesting local information and services from the fixed portion 110 of the wireless communication system 100. The transmitter 302 is coupled to a conventional processor 304 for controlling the transmitter 302 to transmit to the fixed portion 110 of the wireless communication system 100, a message comprising a request for the local information and services, in response to detecting a predetermined user command. A conventional receiver 306 is coupled to the processor 304 for receiving the local information and services from the fixed portion 110 of the wireless communication system 100. A conventional user interface 308, e.g., a keyboard and display, is coupled to the processor 304 for entering the predetermined user command and for conveying the local information and services to a user. In one embodiment, a conventional location detector 310, e.g., a Global Positioning System (GPS) receiver, is also coupled to the processor 304 for determining the location of the mobile station 106. In addition, the mobile station 106 comprises a conventional memory 312 which provides storage for operating software and variables used in accordance with the present invention.

The memory 312 comprises a local information and services requesting program 314 for programming the processor 304 to control the transmitter 302 to request the local information and services from the fixed portion 110 of the wireless communication system 100. The memory 312 further comprises a local category requesting program 316 for programming the processor 304 to cooperate with the fixed portion 110 of the wireless communication system 100 to access a particular category of information and services; to detect the predetermined user command while the mobile station 106 is still accessing the particular category of information and services, e.g., while the information and services are still displayed by the mobile station 106; and to include in the message an indication that the local information and services for the particular category of information and services which was last accessed by the mobile station 106 is desired, in response to detecting the predetermined user command while the mobile station 106 is still accessing the particular category of information and services. In addition, the memory 312 includes a location reporting program 318 for programming the processor 304 to cooperate with the location detector 310 to determine the location of the mobile station 106 and to cooperate with the local information and services requesting program 314 to include the location of the mobile station 106 in the message. The memory also includes a conventional communication processing program 320 for programming the processor 304 to control the transmitter 302 and the receiver 306 to communicate with the fixed portion 110 of the wireless communication system 100 through well-known techniques.

Figure 4:
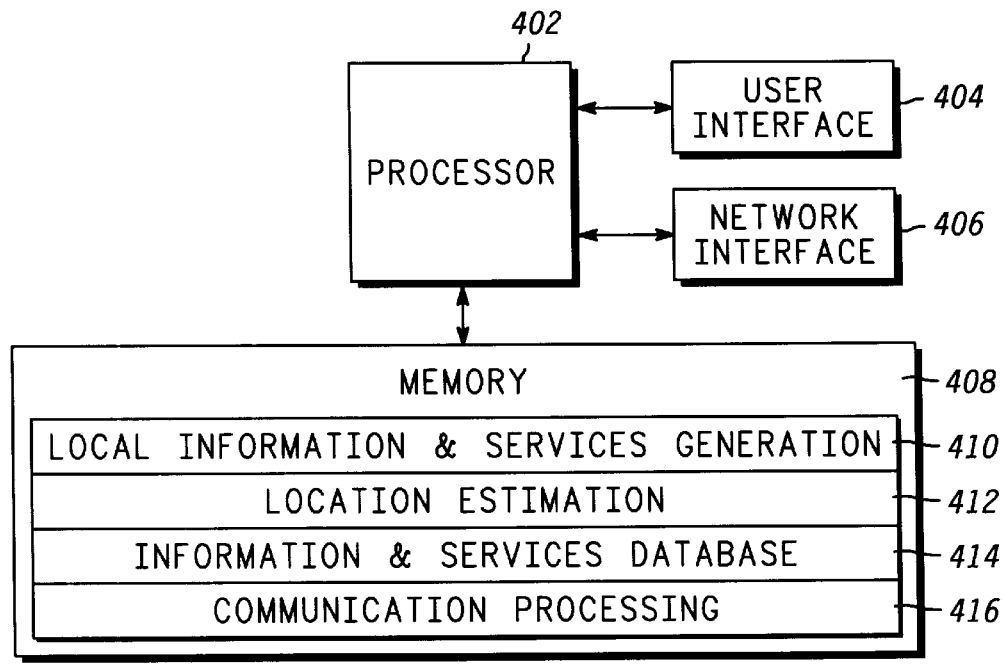
FIG. 4 is an electrical block diagram of an exemplary server in accordance with the present invention.

Referring to FIG. 4, an electrical block diagram depicts an exemplary server 104 in accordance with the present invention, comprising a conventional processor 402 coupled to a conventional user interface 404 for programming and controlling the server 104. The server 104 further comprises a network interface 406 coupled to the processor 402 for interfacing with the network 108. The server 104 also includes a conventional memory 408 coupled to the processor for storing software and information in accordance with the present invention. The memory 408 comprises a local information and services generation program 410 for programming the processor 402 to generate the local information and services. The memory 408 further comprises a location estimation program 412 for programming the processor 402 to estimate the location of the mobile station 106. In addition, the memory 408 includes an information and services database 414 including the local information and services for all locations served by the server 104. The memory 408 also includes a conventional communication processing program 416 for programming the processor 402 to control the network interface 406 to communicate over the network 108 through well-known techniques.

Figure 5:
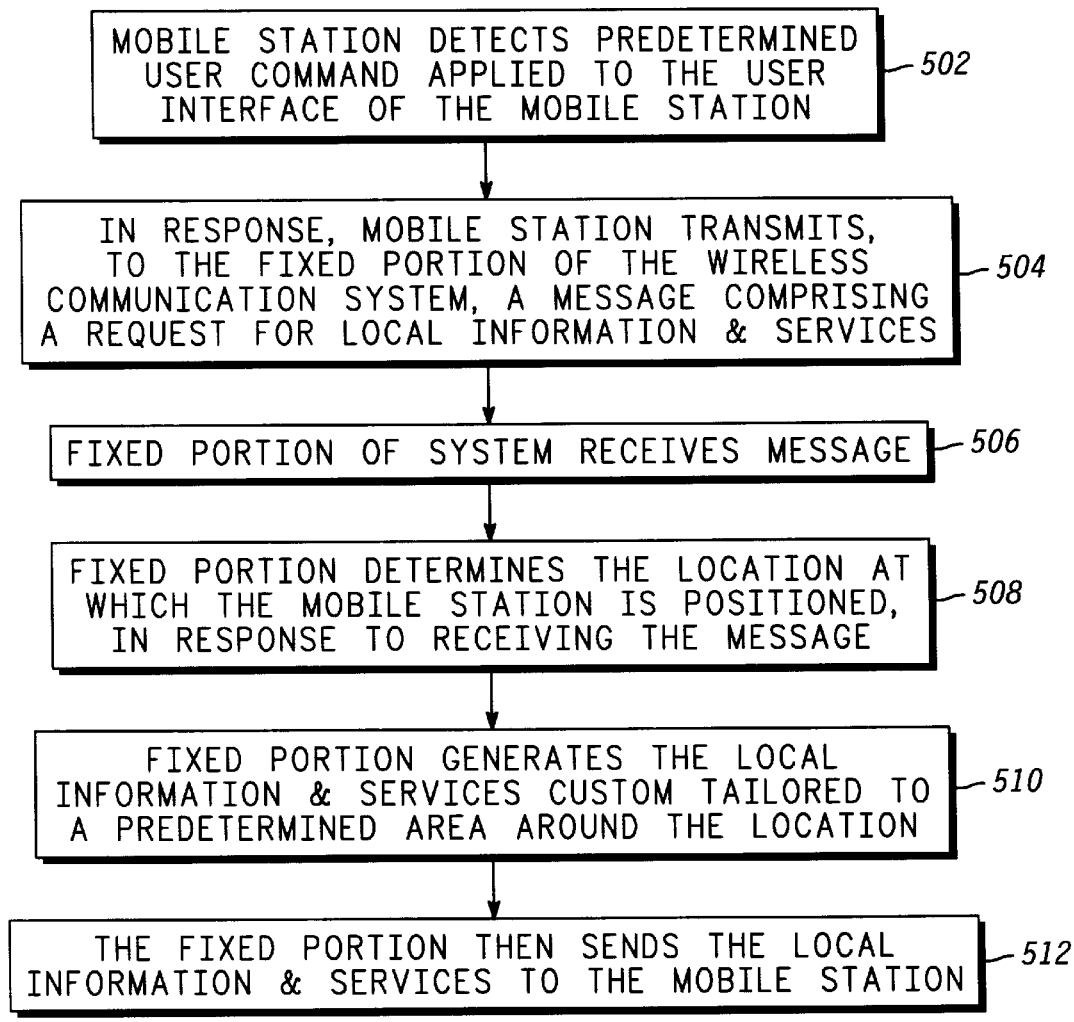
FIG. 5 is a flow diagram depicting a first operation of the wireless communication system in accordance with the present invention.

Referring to FIG. 5, a flow diagram 500 depicting a first operation of the wireless communication system 100 in accordance with the present invention begins with the mobile station 106 detecting 502 a predetermined user command applied to the user interface 308 of the mobile station 106. In one embodiment, the user interface 308 comprises a dedicated button, e.g., a LOCAL button, for entering the predetermined user command. It will be appreciated that, alternatively, another means, e.g., a "soft" key, a "soft" button, a mouse, a track ball, a voice command, and a touch screen, to name a few, may be used to enter the predetermined user command, or to implement the dedicated button. In response to the predetermined user command, the mobile station 106 transmits 504, to the fixed portion 110 of the wireless communication system 100, a message comprising a request for local information and services. The fixed portion 110 receives 506 the message, and, in response, determines 508 the location at which the mobile station 106 is positioned. The location can be determined through several different techniques. When the fixed access station 102 is a short-range station, e.g., a Bluetooth station, the location of the mobile station 106 is preferably estimated to be the same as the location of the fixed access station 102. For such a system, the fixed portion 110 preferably estimates the location of the mobile station 106 from location coordinates of the fixed access station 102. The fixed access station 102 preferably sends the location coordinates to the server 104 for generating the local information and services. Alternatively, the fixed access station 102 can send its station identifier to the server 104, which then performs a table look-up to determine the location of the mobile station 106. In a wide area system, the location detector 310 preferably determines the location coordinates of the mobile station 106 and sends the location coordinates along with the message. The fixed access station 102 then forwards the location coordinates to the server 104, which analyzes the location coordinates to estimate the location of the mobile station 106. It will be appreciated that, alternatively, another locating technique, e.g., triangulation, can be used to locate the mobile station 106. It will be further appreciated that, when the location of the mobile station 106 cannot be determined from the information sent with the message, the server 104 can request the location from the fixed access station 102. In response, the fixed access station 102 can either send the location of the mobile if known, or can request it from the mobile station 106 or from the mobile user.

After determining the location of the mobile station 106, the fixed portion 110 generates 510 the local information and services custom-tailored to a predetermined area around the location. The local information and services are preferably generated in accordance with a set of predetermined categories of information and services. For example, at the airport the local information and services could include flight information, reservation status, gate maps, and restroom, restaurant, lounge, and rental car counter locations. Alternatively, the local information and services can be generated in accordance with a set of custom categories stored in a profile corresponding to the mobile station 106. The profile can, for example, be stored in the memory 312 of the mobile station 106 and sent to the fixed portion 110 with the message. The fixed portion 110 then sends 512 the local information and services to the mobile station 106. Because the mobile station 106 is referably a two-way device, the user can also make changes to some of the local nformation and services. For example, the user can change her airline reservations. The server 104 that performs this first operation of the wireless communication system 100 is preferably a local server programmed specifically for the local area, e.g., the airport vicinity.

Figure 6:
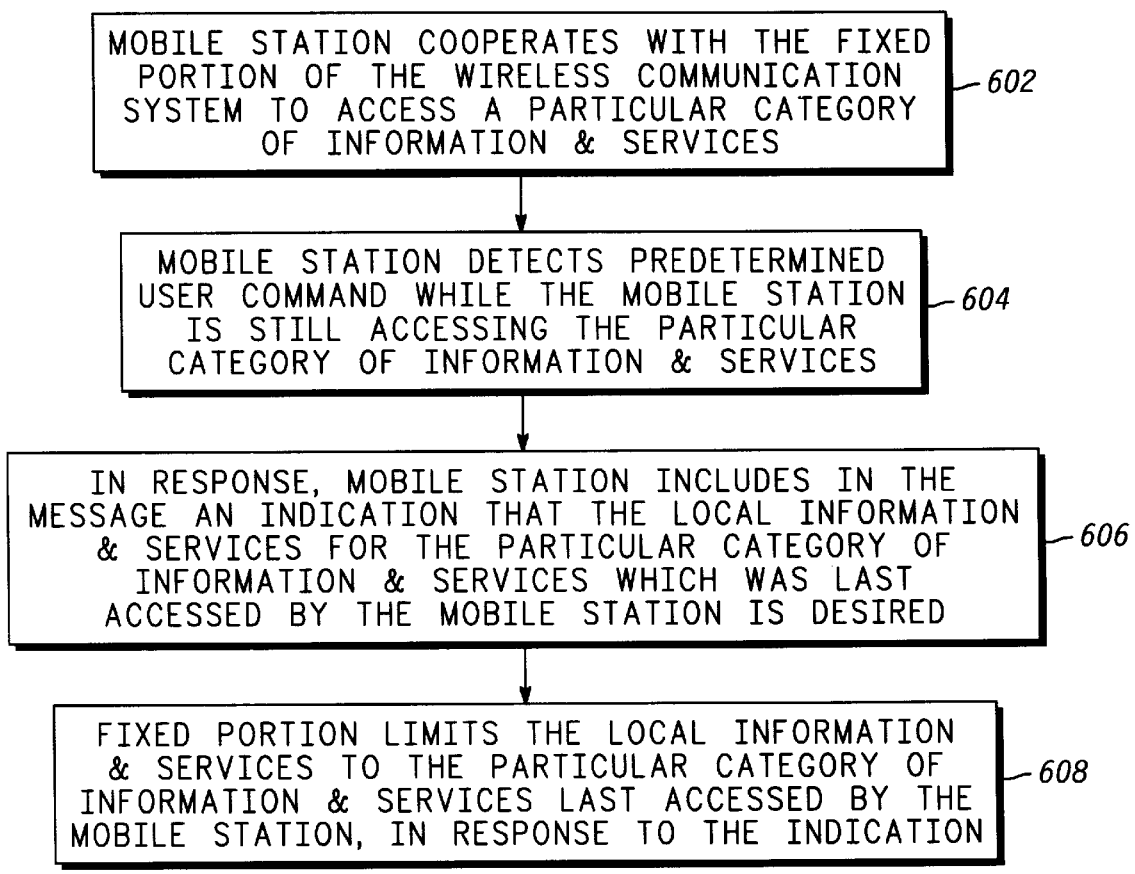
FIG. 6 is a flow diagram depicting a second operation of the wireless communication system in accordance with the present invention.

Referring to FIG. 6, a flow diagram 600 depicting a second operation of the wireless communication system 100 in accordance with the present invention starts when the mobile station 106 cooperates with the fixed portion 110 of the wireless communication system 100 to access a particular category of information and services. For example, the user can activate a browser in the mobile station 106 to access through the fixed portion 110 a page of information about a particular topic, such as Ford trucks. The mobile station 106 then detects 604 the predetermined user command, e.g., depression of the LOCAL button, while the mobile station 106 is still accessing, e.g., displaying, the particular category of information. In response, the mobile station 106 includes 606, in the message requesting local information and services, an indication that the local information and services for the particular category of information and services which was last accessed by the mobile station 106 is desired. The fixed portion 110 then limits 608 the local information and services to the particular category of information and services last accessed by the mobile station 106, in response to the indication. For example, the fixed portion 110 could provide a list of Ford truck dealers within five miles of the mobile station 106. The server 104 that performs this second operation of the wireless communication system 100 is very likely to be a remote server operating in another network, e.g., the Internet. It will be appreciated that, alternatively, the second operation described above can be activated by a second predetermined user command, e.g., a second, LOCALIZER button, or the like.

It will also be appreciated that when operating with an Internet server, the server 104 whose page is being browsed preferably will receive, via the network 108 in cooperation with the Internet, the location of the mobile station 106 and the fact that the local information and services are being requested. The server 104 preferably will then return the appropriate local information and services related to the page being browsed. This, of course, implies that the Internet server is provisioned for compatibility with the present invention in order to respond appropriately. Alternatively, a second, local server can be used to assist the Internet server. The local server can be programmed, for example, with a "yellow pages" directory for providing the local information and services when the Internet server is incompatible with the local information and services feature. While the alternative embodiment is not as flexible as the preferred embodiment, the alternative embodiment may be easier to implement.

Figure 7:
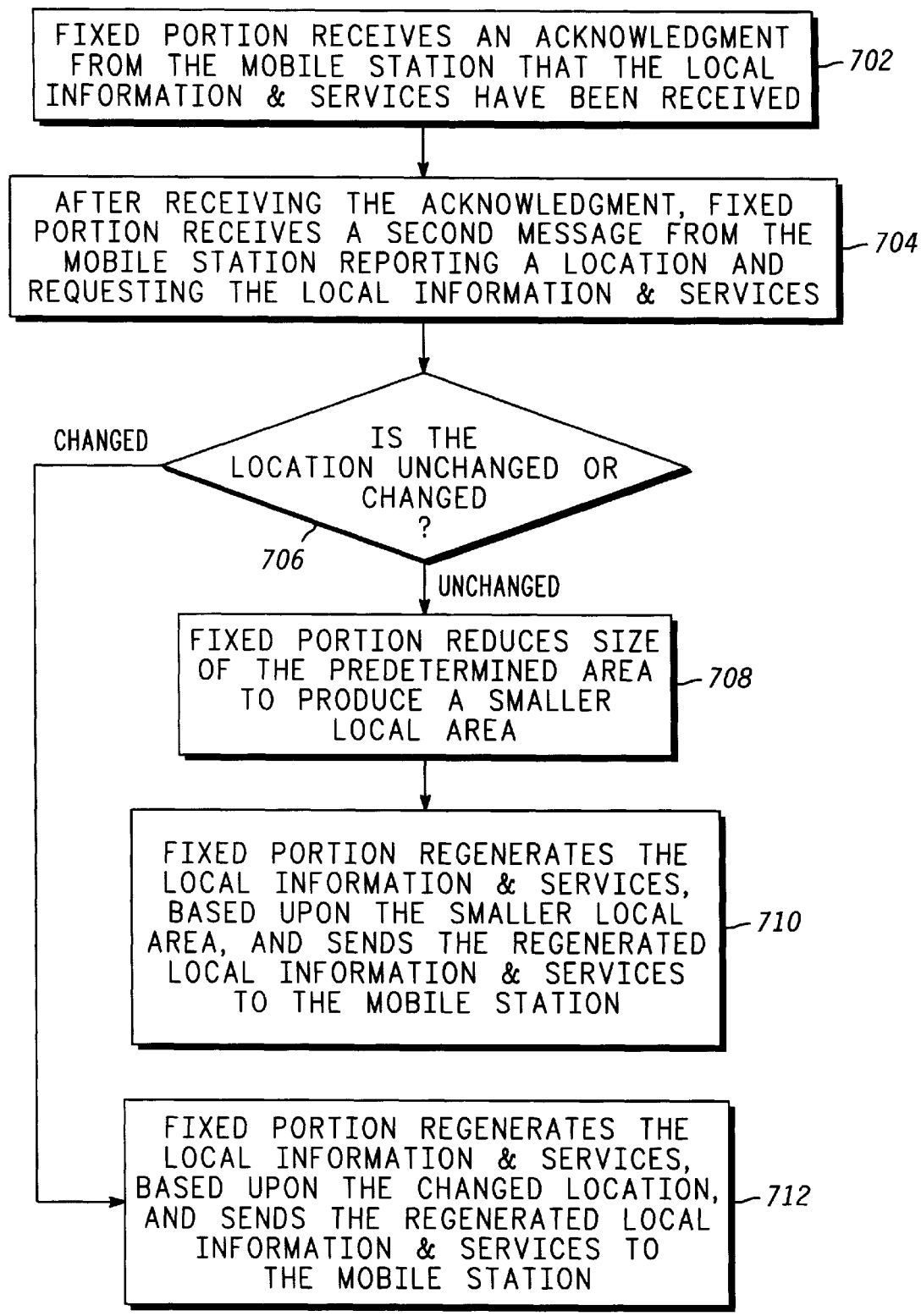
FIG. 7 is a flow diagram depicting a third operation of the wireless communication system in accordance with the present invention.

Referring to FIG. 7, a flow diagram 700 depicting a third operation of the wireless communication system 100 in accordance with the present invention begins with the fixed portion 110 receiving 702 an acknowledgment from the mobile station 106 that the local information and services have been received. After receiving the acknowledgment, the fixed portion 110 receives 704 a second message from the mobile station 106, reporting a location and requesting the local information and services. The fixed portion 110 checks 706 whether the location is unchanged or changed from that of the last request, changed being defined as different by more than a predetermined distance, e.g., the minimum spacing between the fixed access stations 102. If the location is unchanged, the fixed portion 110 reduces 708 the size of the predetermined area around the mobile station 106 that defines the boundary for the local information and services. The fixed portion 110 then regenerates the local information and services, based upon the smaller local area, and sends 710 the regenerated local information and services to the mobile station 106, advantageously providing a "zoom" feature for zooming in on the smaller local area. If, on the other hand, at step 706 the location is changed, the fixed portion 110 regenerates the local information and services, based upon the changed location, and sends the regenerated local information and services to the mobile station 106. Depending upon the type of local information and services being accessed, the server 104 that performs this third operation of the wireless communication system 100 may be either a local server or a remote server operating in another network, e.g., the Internet.

It should be clear from the preceding disclosure that the present invention provides a method and apparatus for retrieving local information and services custom-tailored to a location at which a mobile station is positioned. Advantageously, the method and apparatus functions automatically to provide the local information and services, and does not require the user to enter an address or zip code.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system for retrieving local information and services custom-tailored to a location at which a mobile station is positioned, the method comprising in the mobile station the steps of:
detecting a predetermined user command applied to a user interface of the mobile station; and
transmitting, to a fixed portion of the wireless communication system, a message comprising a request for the local information and services, in response to detecting the predetermined user command, and the method further comprising in the fixed portion of the wireless communication system the steps of:
receiving the message;
determining the location at which the mobile station is positioned, in response to receiving the message;
generating the local information and services in accordance with a set of predetermined categories of information and services stored in a profile corresponding to the mobile station that are custom-tailored to a predetermined area around said location, the predetermined area having a size; and
sending the local information and services to the mobile station.

2. A method in a wireless communication system for retrieving information and services custom-tailored to a location at which a mobile station is positioned,
   the method comprising in the mobile station the steps of:
      cooperating with the fixed portion of the wireless communication system to access a particular category of information and services;
      detecting the predetermined user command while the mobile station is still accessing the particular category of information and services; and
      transmitting a message indicating that the local information and services for the particular category of information and services which was last accessed by the mobile station is desired, in response to detecting the predetermined user command while the mobile station is still accessing the particular category of information and services, and
   the method further comprising in the fixed portion of the wireless communication system the step of:
      receiving the message;
      determining the location at which the mobile station is positioned, in response to receiving the message;
      generating the particular category of information and services custom-tailored to a predetermined area around said location, the predetermined area having a size;
      sending the local information and services to the mobile station; and
      limiting the local information and services to the particular category of information and services last accessed by the mobile station, in response to the indication.

3. A method in a wireless communication system for retrieving local information and services custom-tailored to a location at which a mobile station is positioned,
   the method comprising in the mobile station the steps of:
      detecting a predetermined user command applied to a user interface of the mobile station; and
      transmitting, to a fixed portion of the wireless communication system, a message comprising a request for the local information and services, in response to detecting the predetermined user command, and
   the method further comprising in the fixed portion of the wireless communication system the steps of:
      receiving the message;
      determining the location at which the mobile station is positioned, in response to receiving the message;
      generating the local information and services custom-tailored to a predetermined area around said location, the predetermined area having a size;
      sending the local information and services to the mobile station;
      receiving an acknowledgment from the mobile station that the local information and services have been received;
      after receiving the acknowledgment, receiving a second message from the mobile station reporting an unchanged location and requesting the local information and services;
      reducing the size of the predetermined area to produce a smaller local area, in response to the second message;
      regenerating the local information and services, based upon the smaller local area; and
      sending the regenerated local information and services to the mobile station.

4. A wireless communication system for supplying local information and services to a mobile station, the local information and services custom-tailored to a location at which the mobile station is positioned, the wireless communication system comprising:
   the mobile station;
   a fixed access station which communicates with the mobile station, the fixed access station comprising:
      a receiver for receiving a message from the mobile station, the message comprising a request for the local information and services;
      a processor coupled to the receiver for cooperating with a server to determine the location at which the mobile station is positioned, in response to receiving the message; and
      a transmitter coupled to the processor for sending the local information and services to the mobile station,
   wherein the wireless communication system further comprises
      the server coupled to the fixed access station for generating the local information and services in accordance with a set of predetermined categories of information and services stored in a profile corresponding to the mobile station that are custom-tailored to a predetermined area around said location, the predetermined area having a size.

5. A wireless communication system for supplying information and services to a mobile station, the local information and services custom-tailored to a location at which the mobile station is positioned, the wireless communication system comprising:
   the mobile station;
   a fixed access station which communicates with the mobile station, the fixed access station comprising:
      a receiver for receiving a message from the mobile station, the message comprising a request for the local information and services and includes an indication that the local information and services for a particular category of information and services which was last accessed by the mobile station is desired;
      a processor coupled to the receiver for cooperating with a server to determine the location at which the mobile station is positioned, in response to receiving the message, the processor being programmed to cooperate with the server to limit the local information and services to the particular category of information and services last accessed by the mobile station; and
      a transmitter coupled to the processor for sending the local information and services to the mobile station,
   wherein the wireless communication system further comprises
      the server coupled to the fixed access station for generating the particular category of information and services custom-tailored to a predetermined area around said location, the predetermined area having a size.

6. A wireless communication system for supplying local information and services to a mobile station, the local information and services custom-tailored to a location at which the mobile station is positioned, the wireless communication system comprising:
   the mobile station;
   a fixed access station which communicates with the mobile station, the fixed access station comprising:
      a receiver for receiving a message from the mobile station, the message comprising a request for the local information and services;

a processor coupled to the receiver for cooperating with a server to determine the location at which the mobile station is positioned, in response to receiving the message wherein the processor is programmed to:

cooperate with the receiver to receive an acknowledgment from the mobile station that the local information and services have been received;

after receiving the acknowledgment, cooperate further with the receiver to receive a second message from the mobile station reporting an unchanged location and requesting the local information and services;

cooperate with the server to reduce the size of the predetermined area to produce a smaller local area, in response to the second message;

cooperate further with the server to regenerate the local information and services, based upon the smaller local area; and send the regenerated local information and services to the mobile station, and a transmitter coupled to the processor for sending the local information and services to the mobile station, wherein the wireless communication system further comprises the server coupled to the fixed access station for generating the local information and services custom-tailored to a predetermined area around said location, the predetermined area having a size.

* * * * *